Dec. 8, 1953
A. JOHNSON ET AL
2,661,764
AUTOMATIC EMERGENCY VALVE CONTROL
FOR AIR HOSES AND THE LIKE
Filed Sept. 17, 1951
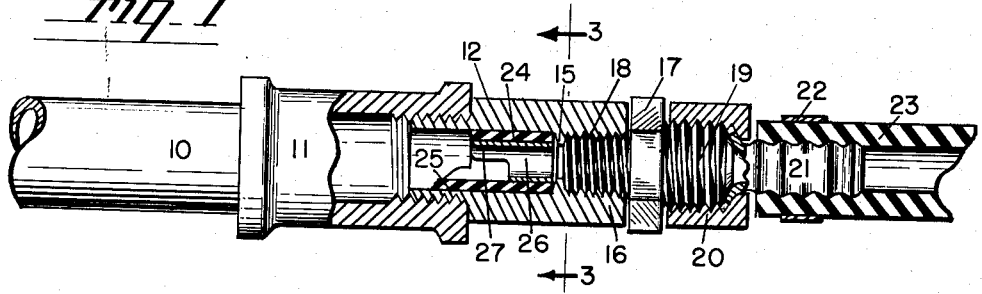
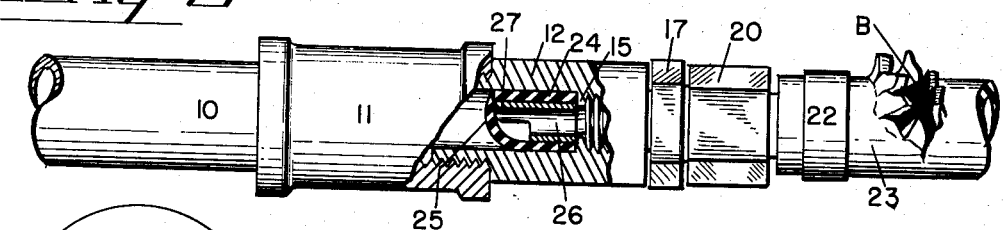
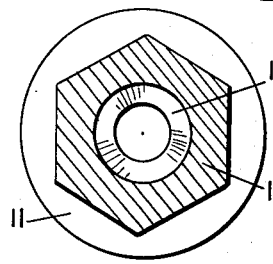
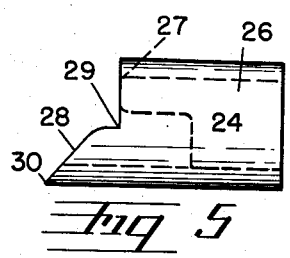
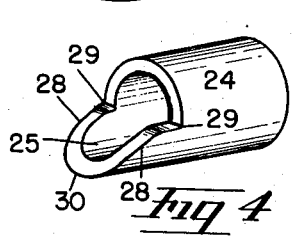
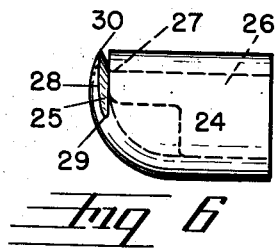
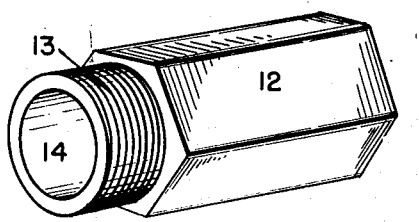
*INVENTORS*
AXEL JOHNSON
BY ANCEL S. PAGE
*F.R.Geisler.*
ATTORNEY Patented Dec. 8, 1953

2,661,764

UNITED STATES PATENT OFFICE 2,661,764

AUTOMATIC EMERGENCY VALVE CONTROL FOR AIR HOSES AND THE LIKE

Axel Johnson and Ancel S. Page, Portland, Oreg.

Application September 17, 1951, Serial No. 246,903

6 Claims. (Cl. 137—517)

This invention relates in general to the employment of air or other gas under pressure for performing certain operations, such as the operation of pneumatic tools and the like, and the operation of air brakes on vehicles, where air under considerable pressure is required to be delivered through a hose or other tube or conduit assembly to the brake, brake booster, or other air-operated mechanism.

The occurrence of a sudden break in such an air line or conduit assembly generally creates an emergency. Thus, in a vehicle air brake system, such a break in the line to the brake booster for one wheel can render the brakes on all the other wheels of the vehicle as well as that particular wheel, inoperative. A break in an air hose to a pneumatic tool frequently causes the hose to flop around in uncontrolled fashion until the source of air is shut off, and workmen have frequently been injured by being struck with the coupling or other attachment at the free end of such a hose before having time to jump out of range.

The object of this invention is to provide a safety emergency air control valve which will operate automatically to shut off or block the passage of air through an air line in which it is installed whenever such a break occurs.

A related object of the invention is to provide an automatic control which will allow the passage of air through the line or tube under normal conditions but which will shut off such passage when a sudden break causes the normal back pressure to cease and a resulting rush of air through the line to start.

An additional object of the invention is to provide a simple, practical and inexpensive valve means which can readily be inserted in an air line coupling and removed therefrom as desired, and which, when in place will function automatically without requiring any attention or care.

In the accompanying drawings, which illustrate the manner in which our automatic valve control is constructed and the manner in which it operates, and to which reference is made in the following brief description of the same:

Fig. 1 is an elevation of a portion of a coupled air line, the coupling members being shown partly in axial sectional elevation, with our automatic valve control in place in one of the coupling members and illustrating the valve control under normal operating conditions;

Fig. 2 is a somewhat similar elevation of the same coupling, partly in section, showing our valve control automatically operating to shut off the sudden rush of air occasioned by a break in the line beyond the valve control;

Fig. 3 is a transverse section through the coupling taken on line 3—3 of Fig. 1;

Figs. 4 and 4A are perspective views of the main valve member and inner metal insert respectively of our valve control, showing the preferred form in which each is made, the two members being entirely separated in the figures but arranged in their relative positions;

Figs. 5 and 6 are enlarged side elevations of the valve, with the inner metal insert indicated in broken lines, and illustrating the valve in normal open position and in closed position respectively; and Fig. 7 is a perspective view of the particular coupling members of Figs. 1 and 2 in which our valve control is shown installed and housed.

Our valve control assembly includes a main valve member 24 (shown most clearly in Fig. 4), formed of rubber or similar resilient, flexible material, a metal insert 26 (shown most clearly in Fig. 4A), adapted to be positioned within the main valve member 24 so as to serve as a partial rigid supporting liner for the resilient main member 24, and a coupling member 12 (Figs. 1 and 7) or other tubular element serving as a housing for the main valve member and its supporting liner.

The valve housing or coupling member 12 in the form illustrated in the drawings has an outer peripheral surface preferably hexagonal in cross section formed in this manner as a convenience in securing the coupling member in place, and has an extension 13 at one end, threaded on the outside and adapted to be screwed into a pipe joint or nipple such as that indicated at 11 in Fig. 1, which pipe joint 11 in turn is mounted on the end of the air supply pipe 10.

A channel 14 (Fig. 7) extends through the coupling member 12 and the end portion 16 (Fig. 1) of this channel is threaded on the inside. The coupling member 12 is also preferably, though not necessarily, formed with an internal annular shoulder 15 (Fig. 1) at the inner end of the internally threaded portion 16 of the channel.

The main valve member 24 (Fig. 4) is tubular with a protruding lip 25 at one end. The lip 25 has an end edge which extends forwardly from two opposite points 29 at the end of the main cylindrical section and forms a beveled edge 30 at the tip end of the lip as shown. The outer surface of the lip 25 constitutes a continuation of part of the cylindrical outer surface of the body of the valve member 24, and this outer surface of the lip normally rests against the channel wall of the coupling member 12 as shown in Fig. 1. The edges of the side walls of the lip 25 extend along convex curves 28 on both sides and lead from the points 29 to the beveled tip edge 30 of the lip.

The metal insert 26 (Fig. 4A) for the main valve member 24 resembles somewhat the main member 24 in shape except that it is shorter in length and has a semi-cylindrical extension 27 in place of the specially formed lip 25 of the main member. The length of the longer side of the insert 26 equals the length of the shorter side of the main valve member 24. The exterior diameter of the insert 26 is slightly greater than the normal inside diameter of the main member 24 so that the insert 26 will fit snugly in the main member 24. The exterior diameter of the main member 24 is approximately equal to the diameter of the channel 14 in the coupling member 12.

As indicated in Figs. 4 and 4A, and as shown in Figs. 1 and 5, the insert 26 is so positioned within the main member 24 that the extension 27 of the insert will be opposite the lip 25. Thus the insert 26 acts as an inside support for the main valve member 24 throughout the entire length of the shorter side of member 24 but acts as a support for only a relatively short distance along the longer side of member 24. The reason for this will be presently apparent.

In the particular air line in which our invention is shown employed by way of illustration in Figs. 1 and 2, an adaptor nipple 17 is connected to the coupling or valve housing member 12. This adaptor niple 17 is formed with a threaded extension 18 on one side, which has threaded engagement with the threaded end of the channel in the member 12, and with another threaded extension 19 on the opposite side on which a clamping sleeve 20 is screwed. A ribbed hose connector 21, of well known construction, extending into the end of the air hose 23, has an enlarged end portion which is held against the nipple extension 19 by the clamping sleeve 20. The customary clamping ring 22 on the end of the air hose 23 holds the latter tightly on the hose conector 21.

In the installation illustrated in Figs. 1 and 2, the compressed air, from any suitable source, delivered through and from the pipe 10, moves in the direction indicated by the arrows and passes through the channel of the coupling 12 and through the channel of the valve member 24 and its metal insert 26, and through the other connector elements to the air hose 23 and thence to the air brake mechanism, or other pneumatic tool mechanism or whatever other device is connected to the air line and operated through the medium of the compressed air. Under all normal operating conditions the main valve member 24 will remain in the position illustrated in Fig. 1 with the lip portion 25, which extends against the direction from which the air is flowing, in contact with the wall of the channel in the housing of the coupling member 12. The flow of air through the channel of the coupling 12, due to the normal back pressure existing in the hose 23 and air line, will not be of sufficient velocity to cause the extending lip 25 to be moved away from contact with the channel wall in the coupling 12, and the shape of the lip, including the beveled edge at the tip, and the thickness of the integral side walls of the lip, and the resiliency of the material from which the valve member 24 is made, will cause any tendency of the flow of air to lift the lip 25 and to pass between the lip and the adjacent wall of the coupling member channel to be resisted. This will be true regardless of the extent to which air pressure is built up in the line since the back pressure restricts the velocity of air flow.

However, should a break occur in the hose 23, such as indicated at B in Fig. 2, or any other failure develop beyond the coupling member 12 which would result in a sudden rush of air through the channel in the coupling member 12, the velocity and force of the air would cause some of the air to be thrust in between the tip of the lip 25 and the adjacent channel wall, pushing the lip away from the channel wall and then causing the lip to be engaged by the body of rushing air and forced into the position illustrated in Fig. 2. In such position the lip 25 will effectively block further flow of air through the channel.

The shape of the lip 25 of the valve member 24, and the shape of the metal insert 26 are contributing factors in enabling the valve satisfactorily to block the air passageway under such conditions, to resist the force of the blocked air, and then to return to normal position when normal condition is again established in the air line. The fact that the metal insert 26 is arranged with its semi-cylindrical extension opposite the valve lip 25 and that the metal insert 26 is cut away adjacent the lip 25, allow a portion of the valve adjoining the lip to move slightly with the lip as to form a more extensive hinge curve. This in turn enables the lip 25 to extend over the entire end of the valve when in the closed position, as shown in Fig. 2, without requiring the lip 25 to be made very long. The walls of the lip, thus the curved edge portions 28 of both side walls (Fig. 4), strengthen the lip while permitting it to roll up into the closing or sealing position of Figs. 2 and 6. As a result the lip 25 is not made any longer than necessary to fit entirely across the channel. It is strong enough to block the channel but at the same time will not buckle under the impact and force of the shut-off air. It will return immediately to normal position when normal conditions are re-established, and it will not interfere with the passage of air through the channel in the coupling member 12 except when there is a failure or break in the air line beyond the valve sufficient to start an abnormal rush of air through the valve.

Preferably the valve housing or coupling member 12 is formed with an annular shoulder 15 (Figs. 1 and 2) in the central channel as a guide for the placing of the valve and its metal insert in the valve housing or coupling. Also such a shoulder prevents any axial or longitudinal movement of the valve in the valve housing under the force of the air.

The particular housing member in which the valve 24 is positioned could, of course, be changed in many ways without departing from the principle of our invention. The main valve 24 and its insert 26 could even be positioned in a pipe or similar tube of the proper diameter, provided suitable means is arranged to hold the valve against any axial movement along the pipe. We have found it most convenient, however, to house the valve in a relatively short coupling member and preferably substantially as shown.

We claim:

1. In an automatic shut-off valve control assembly of the character described, a rigid tubular element, a tubular main valve member of resilient, flexible material positioned in said element, the exterior diameter of said valve member being approximately equal to the internal diameter of said element, the tubular wall of said valve member formed with a protruding trough-like lip extending from one end, the outer surface of said lip normally in contact with the interior wall of said element, said lip having identical side walls merging in a tip, the maximum length of said lip being not greater than the diameter of said interior wall of said element, and a rigid tubular reinforcement in said main valve member, said lip extending entirely beyond the end of said reinforcement, whereby said lip will not be prevented by said reinforcement from being thrust from said interior wall of said element.

2. In an automatic shut-off valve control assembly of the character described, a rigid element, a channel extending through said element, a tubular main valve member of rubber-like material positioned in said channel of said element, the exterior diameter of said valve member being approximately equal to the diameter of said channel in said element, the tubular wall of said valve member formed with an integral protruding trough-like lip extending from one end, the outer surface of said lip normally in contact with the wall of said channel of said element, said lip having identical side walls merging in a tip, the maximum length of said lip being not greater than the diameter of said channel, and a tubular metal insert in said main valve member, said insert having a portion cut away adjoining said lip, so as to leave said lip free to be thrust from said wall of said channel.

3. In an automatic shut-off valve control for use in a conduit assembly delivering gas under pressure, a rigid coupling element, a cylindrical channel extending through said element, a tubular main valve member of resilient, flexible material positioned in said channel of said coupling element, the exterior diameter of said valve member being approximately equal to the diameter of said channel in said coupling element, the tubular wall of said valve member formed with a protruding trough-like lip extending from one end against the direction of the flow of gas in said assembly, the outer surface of said lip normally in contact with the wall of said channel, said lip having identical side walls merging in a tip, said tip having an inwardly-sloping bevel edge, a rigid tubular liner in said main valve member, said lip extending entirely beyond the end of said liner, whereby said lip will not be prevented by said liner from being thrust from said wall of said channel, and means for restraining said main valve member against axial displacement.

4. In a conduit assembly delivering gas under pressure, an automatic shut-off valve control of the character described including a rigid coupling element, a channel extending through said element, a tubular main valve member of rubber positioned in said channel of said coupling element, the exterior diameter of said valve member being approximately equal to the diameter of said channel, the tubular wall of said valve member formed with an integral protruding trough-like lip extending from one end against the direction of the flow of gas in said assembly, said lip being of the same uniform thickness as the body portion of said valve member, the outer surface of said lip normally in contact with the wall of said channel, said lip having identical side walls with their edges extending along convex curves and merging in a tip, the maximum length of said lip being slightly less than the diameter of said channel, a tubular metal reinforcement in said main valve member, said reinforcement having a portion cut away adjoining said lip, so as to leave said lip free to be thrust from said wall of said channel, and means in said channel of said element for restraining said main valve against axial displacement, whereby a sudden abnormal rush of gas through said coupling element and conduit assembly will thrust said lip over the entrance through said main valve member and temporarily block further flow of gas in said conduit assembly.

5. An automatic shut-off valve control for use in a conduit assembly delivering gas under pressure including a rigid tubular coupling element constituting a part of said conduit assembly, means at each end of said element for connecting said element to adjacent elements in said assembly respectively, a tubular main valve member of resilient, flexible material positioned in said tubular coupling element, the exterior diameter of said valve member being approximately equal to the internal diameter of said element, the tubular wall of said valve member formed with a protruding trough-like lip extending from one end against the direction of the flow of gas in said assembly, the outer surface of said lip normally in contact with the interior wall of said tubular coupling element, said lip having identical side walls merging in a bevel edge at the tip, a rigid tubular insert in said main valve member, said lip extending entirely beyond the end of said insert, whereby said lip will not be prevented by said insert from being thrust from said interior wall of said tubular coupling, and means for restraining said main valve member against axial displacement, whereby a sudden abnormal rush of gas through said tubular coupling element and conduit assembly will thrust said lip over the entrance through said main valve member and temporarily block further flow of gas in said conduit assembly.

6. An automatic shut-off valve control of the character described for use in a conduit assembly delivering gas under pressure including a rigid coupling element constituting a part of said conduit assembly, means at each end of said element for connecting said element to adjacent elements in said assembly respectively, a cylindrical channel extending through said element, a tubular main valve member of rubber-like material positioned in said channel of said coupling element, the exterior diameter of said valve member being approximately equal to the diameter of said channel, the tubular wall of said valve member formed with an integral protruding trough-like lip extending from one end against the direction of the flow of gas in said assembly, said lip being of the same uniform thickness as the body portion of said valve member, the outer surface of said lip normally in contact with the wall of said channel, said lip having identical side walls with their edges extending along convex curves and merging in a bevel edge at the tip, the maximum length of said lip being slightly less than the diameter of said channel, a tubular metal liner in said main valve member, said liner having a portion cut away adjoining said lip, so as to leave said lip free to be thrust from said wall of said channel, and means in said channel of said element for restraining said main valve member against axial displacement, whereby a sudden abnormal rush of gas through said coupling element and conduit assembly will thrust said lip over the entrance through said main valve member and temporarily block further flow of gas in said conduit assembly.

AXEL JOHNSON.
ANCEL S. PAGE.

References Cited in the file of this patent
UNITED STATES PATENTS

| Number | Name | Date |
|---|---|---|
| 2,372,726 | Langdon | Apr. 3, 1945 |